May 25, 1965 W. S. PEPPLER 3,184,896
WRAPPING APPARATUS
Filed Aug. 7, 1962
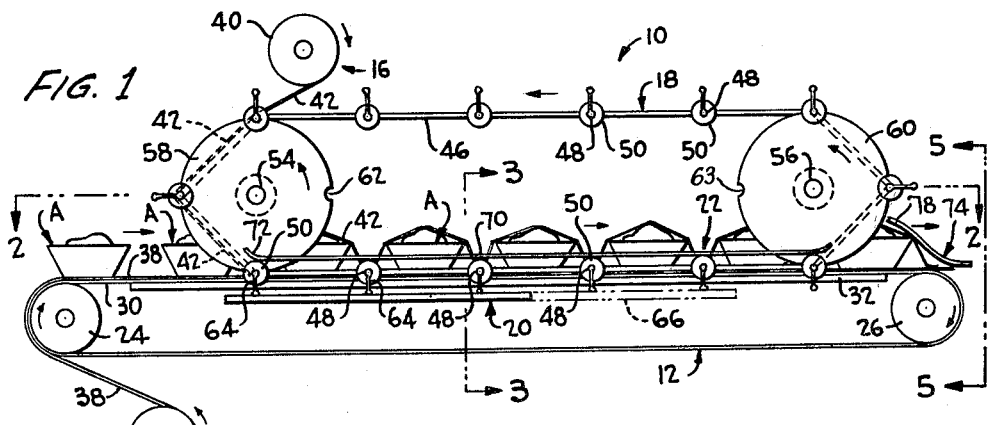
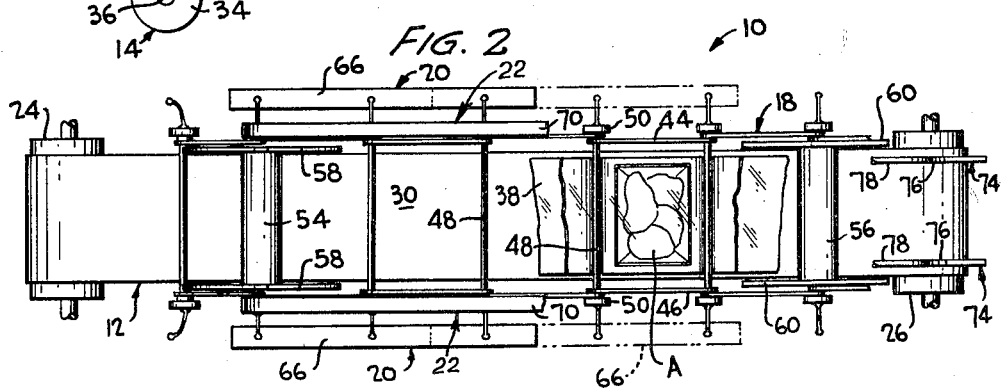
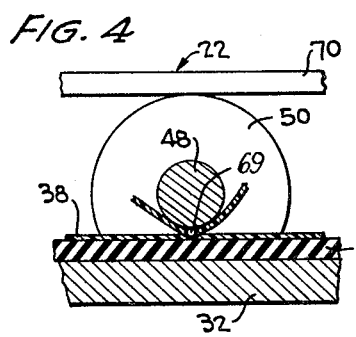
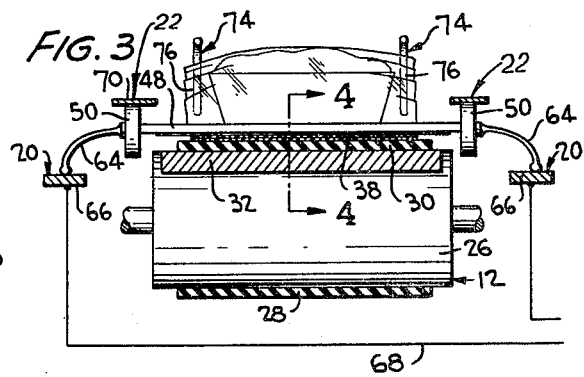
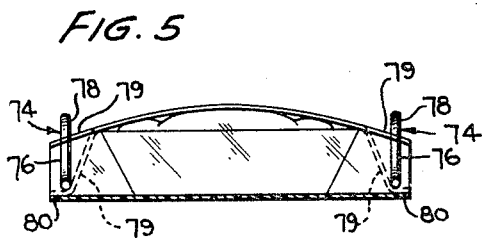
INVENTOR
WILLIAM S. PEPPLER
BY
ATTORNEY United States Patent Office 3,184,896
Patented May 25, 1965

3,184,896
WRAPPING APPARATUS
William S. Peppler, Chappaqua, N.Y., assignor to Diamond International Corporation, a corporation of Delaware
Filed Aug. 7, 1962, Ser. No. 215,414
6 Claims. (Cl. 53—180)

This invention relates generally to apparatus for continuously applying a protective wrap to a plurality of continuously conveyed articles, and more particularly comprises improved means especially adapted for use with shrinkable plastic continuous webs whereby the articles may be continuously, economically, and automatically sealed within a wrapper to form a neat package.

The use of thermo-plastic materials for the purpose of forming wrappers for articles such as pack meat packages, produce, etc. is well known.

Due to the continually rising labor costs and the amount of time required for an individual to wrap a plurality of similar articles with a protective wrapper, the technology is constantly directed toward affording means for continuously wrapping and protecting a plurality of similar articles of the character mentioned above, with a minimum of manual effort in a fool-proof and expeditious manner.

In view of the demand of the art, a primary object of the present invention is to provide apparatus for wrapping articles at a relatively high speed, in a straight-line continuous-motion, utilizing heat shrinkable films or the like, and utilizing continuously conveyed, periodically energized resistance or impulse heated bars which are periodically disposed in spaced relationship on opposite sides of an article to form seals between juxtaposed continuous sources of heat shrinkable films as well as substantially sever or cut the portion of the films being sealed.

An additional object of the present invention in conformance with that set forth above is to provide means whereby the impulse heating of the wrapping films is combined with a constantly applied pressure and such pressure is continuously applied after de-energization of the heating bars initially forming the seal and severing of the wrapping films.

And a still further object of the present invention is to provide novel means for continuously sealing the entire margin of an article disposed between juxtaposed films which are continuously fed to form protecting wrappers by means of periodically energized resistance heaters.

Other objects in the nature and advantages of the instant invention will be apparent from the following description taken in conjunction with the accompanying drawing wherein:

FIG. 1 is a diagrammatic elevational view of the novel wrapping apparatus;

FIG. 2 is a top plan view of the apparatus of FIG. 1 taken substantially on the plane of line 2—2 of FIG. 1, showing in phantom lines the adjusted position of the current conducting bus bar means of the apparatus;

FIG. 3 is an enlarged vertical section taken substantially on the plane of line 3—3 of FIG. 1;

FIG. 4 is a further enlarged, fragmentary, vertical section taken substantially on the plane of line 4—4 of FIG. 3, showing details of the heating rod and cutting wire of the apparatus; and FIG. 5 is an enlarged, fragmentary, vertical section taken substantially on the plane of line 5—5 of FIG. 1, showing the side edge sealing bar means of the apparatus.

Before going into detail with respect to the novel wrapping apparatus, it will be apparent to those skilled in the art, that the material used for wrapping a plurality of continuously conveyed articles, may comprise a continuous web of film of heat-shrinkable material of any suitable character, however, the use of materials other than those which are heat-shrunk, and including thermo-responsive adhesives may likewise be used with the subject apparatus.

Considering FIGS. 1 and 2, the novel apparatus is indicated generally at 10 and comprises an endless conveyor indicated generally at 12, a first source of heat-sealable material indicated generally at 14, a second source of heat-sealable material indicated generally at 16, combined heat-sealing-and-pressure-applying means indicated generally at 18, energizing means indicated generally at 20, and pressure-applying guide means indicated generally at 22.

The conveyor 12 includes space parallel support drums or rolls 24 and 26 having entrained thereover an endless conveyor belt 28 which may comprise a heat-resistant material of laminated silicone rubber or the like with a "Teflon" Fiberglas coating, for example. The conveyor includes an upper horizontal run 30 beneath which is disposed a horizontal bed plate 32 of any suitable material. The conveyor run 30 is moved from left to right as seen in FIG. 1, for example, and will receive thereon a plurality of articles A, which will be longitudinally spaced along the conveyor run 30.

The first source of heat-sealable wrapping material may comprise a convoluted roll 34 disposed on a horizontal axis of rotation 36, the web or film 38 thereof being entrained or juxtaposed over the outer end surface of the conveyor 28 at the drum 24, and extending longitudinally in overlying relationship on the upper surface of the conveyor run 30.

The second source of heat-sealable material may also comprise a convoluted roll 40 which includes web or film portion 42 which will extend forwardly about the forward end of the combined heat-sealing-and-pressure-applying means 18; the latter mentioned means to subsequently be described in detail. The portion 42 extends longitudinally of the upper run 30 of the conveyor belt 28, in overlying relationship with respect to the articles A as clearly shown in the drawing.

Any suitable means may be utilized to operate the conveyor 12 and combine pressure-applying-and-heat-sealing means 18, which will cause the web portions 38 and 42 to be fed longitudinally of the upper run 30 of the conveyor.

The combined pressure-applying-and-heat-sealing means 18 comprises a plurality of pivotally connected or articulated links or chains 44 and 46, which have extending transversely thereacross, to provide the pivotal connection thereof, heat seal bars or rods 48 which are disposed in spaced longitudinal relation. Each of the bars 48 have secured to the terminal ends thereof, outwardly of the opposite side edges of the conveyor run 30 pressure wheels 50. The combined pressure-applying-and-heat-sealing means 18 includes on spaced parallel axes of rotation 54 and 56 pairs of spaced disc elements 58 and 60 which include circumferentially spaced and radially opening notched portions 62 and 63, respectively, the spacing of which conforming with and accommodating individual heating bars 48 therein as clearly illustrated in FIG. 1.

Other types of articulated chains may be used in the pressure-applying-and-heat-sealing means 18, for example, conventional link chains meshed with toothed sprockets (not shown).

Rotation of the discs 58 and 60 in the direction indicated by the direction arrows in FIG. 1, will cause the heat sealing bars or rod elements 48 to be moved in timed relationship along and over the conveyor run 30 of the conveyor 28, the spacing of the rods 48 being that which is necessary to accommodate the articles A between adjacent pairs of the heating bars.

The bars 48 include at the terminal ends thereof "trolley shoe" conductors 64 which are terminally engageable with the energizing means 20. The energizing means 20 comprise spaced parallel bus bars 66 operatively connected to a source of electrical current, the current being indicated diagrammatically at 68, the bus bars 66 being disposed parallel to and below the conveyor run 30 as clearly seen in FIGS. 1 and 3.

Although the bus bars are shown in the preferred embodiment as being below conveyor run 30, these bus bars may be located above the conveyor run and the guide tracks of the pressure-applying guide means 22.

The bus bars 66 are adjustable longitudinally with respect to the conveyor run 30 for the purpose of determining the period of and the position of energization of the heating bars or rod elements 48. The "trolley shoes" of the heating bars and rod elements 48 at the opposite ends of the rods 48 will periodically engage the bus bars 66, the circuit 68 will be closed and accordingly impulse or resistance heating will result and the juxtaposed webs or films 38 and 42 at opposite ends of the articles A will be thermally energized to provide a transverse heat seal at opposite ends of the articles A.

The longitudinal adjustability of the bus bars may be accomplished in different ways in order to afford different heating periods for the elements 48 in relation to the speed of operation of the equipment and sealing and cutting requirements of the film being used; for example, an electrical insulating strip (not shown) may be adjustably mounted on the bus bars 66 to prevent current from being transmitted through the "trolley shoes" 64.

As clearly seen in FIG. 4, the heating bars 48 have extending longitudinally across the lower surface thereof a fine wire element 69 which causes heat to be concentrated between the juxtaposed webs 38 and 42, and due to the concentration of heat at this linear point of contact with the wire 69, the physical character of the material forming the wrapping will be changed to the degree wherein it will either be actually cut, or crystallized to the extent that ready separation may occur between adjacent wrapped articles A. In addition to the cutting by the wire 69, the concentration of heat due to the periodic energization of the rod elements 48, will result in heat sealing occurring on opposite sides of the wire to form intermittent transverse seals at opposite ends of the articles A.

The pressure-applying guide means 22 comprises a pair of spaced, parallel, horizontally-disposed guide tracks or bars 70 which include upwardly turned forward ends 72 for readily receiving the pressure wheels 50 beneath; it being noted that the pressure wheels 50 engage beneath the guide bars 70 in overlying relationship with respect to the bus bars 66, and the guide rails extend beyond or rearwardly of the bus bar, to accordingly provide continued pressure after the heating bars or rod elements 48 have been de-energized. This expedient insures the retention or continued pressure during formation of the seal after impulse heating to accordingly provide a proper air tight seal.

The seals which are formed by means of the apparatus just described, will provide what might be described as a "girdle" wrap i.e. at opposite ends of the articles A assuming that the ends of the articles extend from left to right along the conveyor run 30.

Indicated generally at 74 are heating means comprising constantly or periodically energized heating rods 76 (the heating means circuit not being shown) which are disposed inwardly or over the opposite edges of the conveyor run 30 and webs 38 and 42 and have an upper portion 78 extending downwardly toward converging relationship with the upper surface of the conveyor run 30, and as shown in FIG. 5. The rods 76 will engage the web portion 42 at the side edge portions 79 thereof, and urge the side edge portions into engagement with the side edge portions 80 of the web portion 38 to form side edge seals for the wrapper being formed.

Not only may the articles A be readily wrapped, but in the case of perishables such as meats, vegetables or the like, the seals are substantially air tight, and maintain a sealed atmosphere about the articles being wrapped.

Briefly in review, there has been disclosed apparatus for continuously and efficiently applying a partial "girdle" wrap or complete wrap about continuously conveyed articles, utilizing periodic impulse heating, constant application of pressure in conjunction with the application of pressure after periodic impulse heating, these features providing economically operated, efficient, and relatively foolproof means for continuously wrapping conveyed articles.

It will be obvious to those skilled in the art that various changes may be made without departing from the sphere of the invention and therefore the invention is not intended to be limited to what is shown in the drawings and described in the specification but only as indicated in the appended claims.

What is claimed is:

1. Apparatus for applying a wrapper of heat-sealable material about a continuously conveyed article, comprising in combination conveyor means comprising an endless conveyor belt including a substantial horizontal, continuous upper run defining a substantially single plane of travel, said upper conveyor run comprising a continuous upper, flat, pressure-receiving surface providing a base for receiving longitudinally spaced articles thereon, a combined heat-sealing and pressure-applying means disposed in overlying longitudinally spaced relation along said upper conveyor run and including a plurality of longitudinally spaced heat-sealing bars supported for movement along said conveyor run and disposed transversely of and engageable on the upper surface of said conveyor run for pressurized engagement thereon, said bars including terminal abutments and terminal contacts for engagement with a source of current to energize and heat said bars, electrical energizing means comprising elongated bus bars disposed outwardly of and parallel to said upper conveyor run for engagement by said terminal contacts to energize said bars during an increment of travel of said bars and conveyor, and pressure applying guide means comprising elongated track elements disposed parallel to and along the side edges of said conveyor run for engagement on said terminal abutments at the ends of said heat bars during an increment of travel for retaining the bars in pressurized engagement on the upper surface of said conveyor run during energization of said bars.

2. The apparatus as claimed in claim 1 in which said terminal abutments comprise wheel elements journaled on opposite ends of said heat-sealing bars, said track elements including an upturned terminal end portion facilitating movement of said heat-sealing bar wheel elements therebeneath.

3. The structure of claim 1 wherein said endless conveyor belt comprises an electrical insulating material.

4. The structure of claim 1 including heat-sealing rod means disposed longitudinally in overlying parallel relation to said conveyor run side edges for engaging and heat-sealing the side edges of said sources of heat-sealable material to form a completely peripheral seal and wrapping about the articles being protected.

5. The structure of claim 1 wherein said heat-sealing-and-pressure-applying means comprises a second endless conveyor including said heat bars disposed transversely thereacross, said second endless conveyor comprising support elements disposed on horizontal axes of rotation above said first mentioned conveyor means and including articulated links operatively connected to said heat bar portions.

6. The structure as claimed in claim 5 in which said second conveyor comprises pairs of spaced disc elements on said axes of rotation, said disc elements including circumferentially spaced notches in the periphery thereof, said heat-sealing bars being engageable in said notches for movement with said discs.

References Cited by the Examiner
UNITED STATES PATENTS

| | | | |
|---|---|---|---|
| 2,549,122 | 4/51 | Osterhof | 53—33 X |
| 2,590,379 | 3/52 | Cloud | 53—28 |
| 2,918,772 | 12/59 | Bell et al. | 53—389 X |
| 2,959,901 | 11/60 | Conti | 53—182 X |
| 3,090,174 | 5/63 | Kraft | 53—182 X |

FRANK E. BAILEY, *Primary Examiner.*
TRAVIS S. McGEHEE, *Examiner.*